United States Patent
Foucher et al.

[11] Patent Number: 5,958,998
[45] Date of Patent: Sep. 28, 1999

[54] INK JET INKS

[75] Inventors: Daniel A. Foucher, Toronto; Raj D. Patel, Oakville; Patricia A. Burns, Milton; Marcel P. Breton, Mississauga; Guerino G. Sacripante, Oakville, all of Canada

[73] Assignee: Xerox Corporation, Stamford, Conn.

[21] Appl. No.: 09/019,472

[22] Filed: Feb. 5, 1998

[51] Int. Cl.⁶ .......................... C09D 11/02; C09D 11/00
[52] U.S. Cl. .................. 523/160; 106/31.27; 106/31.28
[58] Field of Search .................. 523/160, 161; 106/31.27, 31.28, 31.29, 31.13

[56] References Cited

U.S. PATENT DOCUMENTS

| | | | |
|---|---|---|---|
| 4,532,530 | 7/1985 | Hawkins | 346/140 R |
| 4,627,875 | 12/1986 | Kobayashi et al. | 106/22 |
| 4,680,332 | 7/1987 | Hair et al. | 524/337 |
| 4,692,188 | 9/1987 | Ober et al. | 523/300 |
| 4,705,567 | 11/1987 | Hair et al. | 106/20 |
| 4,737,190 | 4/1988 | Shimada et al. | 106/22 |
| 4,877,451 | 10/1989 | Winnik et al. | 106/23 |
| 4,996,252 | 2/1991 | Phan et al. | 524/88 |
| 5,006,598 | 4/1991 | Adams et al. | 524/601 |
| 5,120,361 | 6/1992 | Winnik et al. | 106/22 |
| 5,156,675 | 10/1992 | Breton et al. | 106/22 |
| 5,348,832 | 9/1994 | Sacripante et al. | 430/109 |
| 5,364,462 | 11/1994 | Crystal et al. | 106/22 |
| 5,378,574 | 1/1995 | Winnik et al. | 430/115 |
| 5,385,957 | 1/1995 | Tobias et al. | 523/161 |
| 5,523,335 | 6/1996 | Whyzmuzis et al. | 523/160 |
| 5,604,076 | 2/1997 | Patel et al. | 430/137 |
| 5,631,309 | 5/1997 | Yanagi et al. | 523/160 |
| 5,643,357 | 7/1997 | Breton et al. | 106/31.25 |
| 5,648,193 | 7/1997 | Patel et al. | 430/137 |
| 5,658,704 | 8/1997 | Patel et al. | 430/137 |
| 5,684,063 | 11/1997 | Patel et al. | 523/161 |
| 5,690,721 | 11/1997 | Itoh | 106/31.13 |
| 5,762,895 | 6/1998 | Wong et al. | 106/31.89 |
| 5,764,261 | 6/1998 | Koike et al. | 347/100 |
| 5,772,746 | 6/1998 | Sawada et al. | 106/31.86 |
| 5,837,754 | 11/1997 | Shimomura et al. | 523/161 |

*Primary Examiner*—Vasu Jagannathan
*Assistant Examiner*—Callie E. Shosho
*Attorney, Agent, or Firm*—E. O. Palazzo

[57] ABSTRACT

An ink composition comprised of from about 20 to about 80 weight percent of water, from about 1 to about 25 weight percent of pigmented polymer, oil soluble colorant, and optionally from about 2 to about 50 weight percent of a glycol, and wherein the oil soluble colorant is present in an amount of from about 0.01 to about 30 weight percent of the pigmented polymer.

30 Claims, No Drawings

INK JET INKS

PATENTS AND PENDING APPLICATIONS

Illustrated in U.S. Pat. No. 5,684,063, the disclosure of which is totally incorporated herein by reference, is a process for the preparation of inks comprised of i) flushing pigment into a sulfonated polyester resin, and which resin possesses a degree of sulfonation of from between about 2.5 and about 20 mol percent;

ii) dispersing the pigmented polyester resin in water at a temperature of from about 40° C. about 95° C. by a polytron shearing device operating at speeds of from about 100 to about 5,000 revolutions to yield stable pigmented submicron sized particles of from about 5 to about 150 nanometers; and thereafter separating said submicron particles and mixing said submicron particles with water. Also, certain inks with sulfo-polyester dye resins are illustrated in U.S. Pat. Nos. 5,658,704; 5,648,193 and 5,684,063, the disclosures of each being totally incorporated herein by reference.

Inks are also illustrated in the following copending applications, Ser. Nos. 09/017,072, 09/017,533, 09/017,459, 09/017,537 and U.S. Pat. No. 5,863,320 the disclosures of each application being totally incorporated herein by reference.

The appropriate components and processes of the above patents and patent applications, especially the sulfonated polyesters may be selected for the present invention in embodiments thereof.

BACKGROUND OF THE INVENTION

The present invention is generally directed to inks, and more specifically, thermal ink jet inks and processes thereof. In embodiments, the present invention is directed to inks obtained by the addition of oil soluble dyes, especially highly, about 20 to about 60 weight percent loading soluble dyes to colored, like pigmented polymer particles, especially the sulfopolyester resins indicated in the appropriate patents and copending applications recited herein, to form ink jet inks with water and wherein the optical density thereof is improved, especially on paper and transparencies. More specifically, the present invention relates to inks obtained by the incorporation therein of an effective small amount, for example about 0.05 to about 5 weight percent, of an oil soluble dye, and which inks possess excellent waterfastness, superior smear resistance, and high optical densities of, for example, from about 1.4 to about 1.6 as measured using a MacBeth or X-Rit densitometer compared to similar inks without such dyes wherein the optical density thereof is from about 1.2 to about 1.3. The present invention in embodiments thereof enables the utilization of polymers obtained by polycondensation reactions, such as polyesters, and more specifically, the sulfonated polyesters as illustrated in U.S. Pat. No. 5,348,832, and U.S. Patent No. 5,604,076, the disclosures of which are totally incorporated herein by reference.

Main advantages associated with the inks of the present invention are the selection of pigmented inks with excellent lightfastness; the use of oil soluble dyes which enables the design of inks with improved color saturation; the use of oil soluble dyes which permits more ink design latitude since for example, a lower concentration of colorants, such as pigments can be used by also employing known dyes as colorants, and the oil dye also allows inks with a superior color gamut and higher color saturation.

The following characteristics are generally desired for inks utilized in ink jet printing processes:

(1) the ink should possess liquid properties, such as viscosity, surface tension and electric conductivity, corresponding to the discharging conditions of the printing apparatus, such as the driving voltage and driving frequency of the piezoelectric electric oscillator;

(2) the ink should be capable of being stored for extended time periods without causing clogging of printhead orifices during use;

(3) the ink should be quickly fixable onto a recording media, such as paper, film, and the like, such that the outlines of the resulting ink dots are smooth and there is minimal blotting of the dotted ink;

(4) the resultant ink image should be of high quality, such as having a clear color tone and high density. The ink image should also possess high gloss and high color gamut and more importantly high optical density;

(5) the resultant ink image should exhibit excellent waterfastness (water resistance) and lightfastness (light resistance);

(6) the ink should not substantially chemically attack, corrode or erode surrounding materials, such as the ink storage container, printhead components, orifices, and the like;

(7) the ink should not have an unpleasant odor and should not be toxic or inflammable; and/or (8) the ink should exhibit low foaming and high pH stability characteristics.

PRIOR ART

Various inks for ink jet printing processes are known. For example, various ink jet inks are disclosed in U.S. Pat. Nos. 4,737,190 and 5,156,675. Generally, the ink jet inks of the prior art are aqueous inks comprising a major amount of water, a humectant and/or a cosolvent, and a dye. By selecting specific humectants, dyes, or other components, it is possible to adjust the print characteristics of the resultant ink.

Ink jet printing systems can generally be classified as continuous stream and drop-on-demand. In drop-on-demand systems, a droplet is ejected from an orifice directly to a position on a recording medium in accordance with digital data signals. A droplet is not usually formed or expelled unless it is to be placed on the recording medium. A second type of drop-on-demand system is known as thermal ink jet, or bubble jet. With this type, there are apparently generated high velocity droplets and there is allowed very close spacing of the nozzles. Thermal ink jet processes are well known as indicated herein, and are described, for example, in U.S. Pat. Nos., 5,169,437, 5,207,824, 4,601,777; 4,251,824; 4,410,899; 4,412,224 and 4,532,530, the disclosures of each of which are totally incorporated herein by reference.

Known ink jet inks generally comprise a water soluble dye which is soluble in an ink vehicle such as water or a mixture comprising water and a known water soluble or water miscible organic solvent. Inks comprising these soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, a number of these known ink dyes may be potentially toxic or mutagenic.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion is comprised of for example, a polymer obtained from monomers having mainly polymerizable vinyl groups into which hydrophilic portions such as carboxylic acid groups, sulfonic acid groups, sulfate groups, and the like are introduced. The ink compositions disclosed may also include additives such as surfactants, salts, resins, and dyes.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, in U.S. Pat. No. 5,378,574, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads, and less stable during storage, disadvantages avoided, or minimized with the inks of the present invention.

In U.S. Pat. No. 5,120,361, the disclosure of which is totally incorporated herein by reference, there is disclosed an ink composition comprised of a solution comprised of a dendrimer and a dye or dyes, which dyes are visible, or can be seen under normal viewing conditions, and wherein the dendrimer can be a first, second or third generation dendrimer.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means, such as a pulse converter, and then applied to the piezoelectric oscillator. A change in pressure on the ink within an ink chamber in the printhead caused by the recording signal results in droplets of ink being ejected through an orifice to a recording medium. reference for example, U.S. Pat. No. 4,627,875, the disclosure of which is totally incorporated herein by reference.

Various inks for ink jet printing processes are known, for example, various ink jet inks are disclosed in U.S. Pat. Nos. 4,737,190 and 5,156,675. Generally, the ink jet inks of this prior art are aqueous inks comprising a major amount of water, a humectant and/or a cosolvent, and a water soluble dye. By selecting specific humectants, dyes, or other components, it is possible to adjust the print characteristics of the resultant ink.

U.S. Pat. No. 5,364,462, the disclosure of which is totally incorporated herein by reference, describes dye-based inks comprised for example, of a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone, may also be added to the ink to improve the solubility and stability of the dye solution.

Sulfopolyester resins are known and are generally available commercially from Eastek Inks, a business unit of Eastman Chemical Company. These sulfopolyester resins are suitable for use in overprint lacquers and primers, as described in Kenneth R. Barton, "Sulfopolyesters: New Resins for Water-Based Inks, Overprint Lacquers and Primers", *American Ink Maker*, pp. 70 to 72 (October, 1993).

SUMMARY OF THE INVENTION

A need continues to exist for improved inks, and more specifically inks that provide high quality prints on a wide variety of recording media, including plain paper. Although a number of currently available ink jet inks may provide waterfast images with substrate latitude, these inks may be unacceptable in that they generally smear and have poor latency and maintainability characteristics. In addition, such inks are generally difficult to manufacture. Thus, there also remains a need for improved black and colored inks that can be easily prepared and can be obtained at a lower cost. There also remains a need for inks with high optical densities. Moreover, there is a need for certain colored inks, such as cyan, and yellow with excellent color intensity and wherein the colored emulsions selected are of a particulate size range of from about 10 to about 120 nanometers. These and other needs may be achievable in embodiments of the present invention.

The present invention provides inks, and processes for generating ink jet ink compositions with for example, excellent waterfastness, excellent high optical densities, and acceptable high print quality on a wide variety of print media, including paper and transparencies. The ink compositions compositions of the present invention and inks prepared by the processes of the present invention also possess in embodiments a wide color gamut, or color gamut varieties, high gloss, excellent lightfastness, high stability, improved drying time, reduced intercolor bleed, reduced odor retention and minimal toxicity, and compatibility with the ink jet printing environment and apparatus, and significantly improved print quality on plain paper, as compared to a number of other known ink compositions. Significantly, the present invention provides ink compositions with improved adhesion of pigments on print media while allowing for a higher loading of colorant in the ink.

The present invention relates to an ink composition comprised of from about 20 to about 80 weight percent of water, from about 1 to about 25 weight percent of pigmented polymer, oil soluble colorant, and from about 2 to about 50 weight percent of a glycol, and wherein said oil soluble colorant is present in an amount of from about 0.01 to about 30 weight percent of the pigmented polymer; wherein the oil soluble colorant is an oil soluble dye, and which dye is present in an amount of from about 1 to about 5 weight percent, and wherein the pigmented polymer is present in an amount of form about 1 to about 20 weight percent; wherein said pigmented polymer is present in an amount of about 5 weight percent; wherein said polymer is a polyester, a styrene, a polystyrene/acryl ate, or a polystyrene/methacrylate; wherein said polymer is a sulfonated polyester; wherein said pigmented polymer contains as the pigment carbon black, cyan, magenta or yellow; wherein said oil soluble dye is black, yellow, magenta, cyan, red or blue; wherein the polymer is a sulfopolyester oligomer with a weight average molecular weight of from about 1,000 to about 10,000; wherein the sulfopolyester is an oligomer with a weight average molecular weight of about 5,000; wherein the pigment for said pigmented polymer is present in an amount of from about 1 to about 20 weight percent based on the weight percent of-the repeat unit of the polymer; wherein the polymer is the sulfopolyester copoly(1,2-propylene-diethylene)terephthalate-copoly(sodium sulfoisophthalate dicarboxylate; an ink further containing ink additives; an ink wherein the ink additive is a humectant; wherein the dye is Disperse Blue 3 (C.I. 61505), Disperse Blue 14 (C.I. 61500), Disperse Orange 1 (C.I. 11080), Disperse Orange 3 (C.I. 11005), Disperse Orange 11 (C.I. 60700), Disperse Orange 13 (C.I. 26080), Disperse Red 1 (C.I. 11110), Disperse Red 13 (C.I. 11115), Disperse Yellow 3 (C.I. 11855), Disperse Yellow 7 (C.I. 26090), Disperse Yellow 9 (C.I. 10375), Sudan 1 Yellow (C.I. 12055), Sudan II Orange (C.I. 12140), Sudan III Red (C.I. 26100), Sudan IV Red (C.I. 26105), Sudan Black B (C.I. 26150), Sudan Blue 1 (C.I. 61552), Sudan Blue II (C.I. 61554), Sudan Orange G (C.I. 11920), or Sudan Red 7B (C.I. 26050); wherein the glycol is present in an amount of from about 2 to about 25 percent by weight; an ink composition comprised of water, colored polymer, and oil soluble colorant; wherein the colorant is a dye, the colored polymer is a pigmented polymer of a pigmented sulfonated polyester, and wherein there is selected from about 20 to about 80 weight percent of water, from about 1 to about 25 weight percent of pigmented sulfonated polyester, and from about 2 to about 50 weight percent of ink additive of a glycol, and wherein said oil soluble dye is present in an amount of from about 0.01 to about 20 weight percent of the pigmented polymer; a printing process which comprises (1) incorporating into an ink jet printing apparatus the ink composition of claim 2, and (2) causing droplets of the ink to be ejected in an image wise pattern onto a substrate; a printing process wherein the ink jet printing apparatus employs a thermal ink jet printing process, and wherein there are provided prints on paper with solid area coverage with an optical density of from about 0.001 to about 0.05, and wherein the prints possess a waterfastness of from about 80 percent to about 99 percent; a process for the preparation of inks jet inks which comprises the mixing of an oil soluble colorant and a pigmented polymer; a process wherein prior to or subsequent to mixing said oil soluble colorant is added in an amount of from about 0.1 to about 25 weight percent; a process wherein said colorant is a dye and said dye is selected in an amount of from about 0.1 to about 5 weight percent; a process wherein said pigmented polymer is generated by the flushing of said pigment in said polymer, and which polymer is a sulfonated polyester, and which resin has a sulfonation degree of from about 2.5 to about 20 mol percent based on the repeat unit of the polymer, and thereafter dispersing the resulting sulfonated pigmented polyester resin into warm water, which water is at a temperature of from about 40° C. to about 95° C., and at which dispersing is with a high speed mixing device thereby enabling the formation of stable submicron particles, and which particles are of a volume average diameter of from about 5 to about 150 nanometers; and a process wherein said pigment polymer contains from about 5 to about 25 weight percent of pigment based on said polymer, and said dye is present in an amount of from about 1 to about 5 weight percent.

The present invention in aspects thereof relates to inks and to processes for the preparation thereof, which inks are comprised of water, known optional ink additives, an optional cosolvent, and a colored dissipatable polyester preferably a sulfopolyester and which inks can be prepared for example, by a process involving flushing to incorporate the pigment, followed by an additional melt extrusion process to incorporate the organic oil soluble colorant and more specifically dye, to achieve for example, high optical density values. Alternatively, the organic soluble colorant, or dye can be incorporated into the sulfo-polyester resin prior to or during the flushing of the pigment. The colored resin/dye particles prepared are dissipatable in water, in that they form for example, spontaneous emulsions as indicated herein from which ink jet inks can be formulated.

More specifically, the process of the present invention comprises the mixing of, or the addition of an oil soluble dye, which dye can be for example, added during or subsequent to flushing a sulfonated polyester resin with pigment, followed by dispersing the dye/pigmented resin in warm water (about 5° C. to about 1° C. greater or equal to about the Tg of the sulfo-polyester) providing a stable dispersion of submicron dye/pigmented particles suitable for the generation of an ink jet ink. For example, 200 grams of a flushed pigmented sulfonated polyester containing about 10 to about 20 weight percent of pigment, and more specifically a pigment presscake available from Sun Chemicals is heated in a stainless steel reactor to between about 150 to about 175° C. at which point less than about 1, or about for example, 1 to 5 weight percent of an organic soluble dye, preferably dyes that are very soluble in polyesters, for example from about 10 to about 60 weight percent of the dye is soluble in the polyester, is added to the pigmented melt, followed by stirring for an effective time period, for example, from about 10 to about 20 minutes. About 10 to about 25 weight percent of the resulting dye/pigmented resin is then dispersed into warm water (about 60° C. to about 75° C. forming a stable emulsion that than can be formulated into inks. Oil soluble dye refers for example, to dyes that have substantially no solubility in water and that will or can dissolve in the polymer, or resin reference to, such as the polyester resin. Dye solubility can also be determined with oil centrations of greater than about 1 percent by weight and preferably as high as about 50 percent by weight, and more specifically from about 5 to about 25 weight percent.

The liquid vehicle of the inks of the present invention can be comprised of various known components, such as water, a mixture of water and a miscible organic component, such as a glycol, like ethylene glycols, propylene glycols, diethylene glycols, glycerine, dipropylene glycols, polyethylene glycols, polypropylene glycols, and the like; amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other suitable water miscible materials; mixtures thereof; and the like, with water being preferred. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water, the humectants, and the like generally possess absorption characteristics on paper and evaporation properties allowing for the desired ink jet printing speed when the ink is to be used in an ink jet printing process. With the inks of the present invention, in embodiments the liquid vehicle can be present in an amount of from about 50 to about 99.5 percent by weight, or parts and preferably from about 75 to about 99 percent by weight.

Optional additives can also be present in the inks of the present invention as indicated herein. For example, one or more surfactants or wetting or dispersing agents can be added to the ink. These additives may be of the cationic, anionic, amphoteric, or nonionic types. Suitable surfactants and wetting or dispersing agents include TAMOL® SN, TAMOL® LG, those of the TRITON® series available from Rohm and Haas Company, those of the MARASPERSE® series, those of the IGEPAL® series available from GAF Company, those of the TERGITOL series, STRODEX PK-90™ available from GAF, PLURONIC F-68™ available from BASF, KARASPERSE TU™ available from Marasperse, and other commercially available surfactants. These surfactants and wetting agents are each present in any effective amounts, generally from 0 to about 15 percent by weight, and preferably from about 0.01 to about 8 percent by weight.

Polymeric additives or dispersants in effective amounts of, for example, about 1 to about 15, and from about 3 to about 7 weight percent for enhancing the viscosity of the ink can also be added to the inks of the present invention. Examples of polymeric additives include water soluble polymers, such as gum arabic, polyacrylate salts, polymethacrylate salts, polyvinyl alcohols, hydroxypropylcellulose, hydroxyethylcellulose, polyvinyl pyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other known polyethyleneimine derivatives can be added to the ink.

Other optional additives for further improving the jetting characteristics and the storage stability of the inks, and for preventing, or minimizing undesirable interactions of the inks with the printhead either during the jetting process or while the printer is idle include humectants such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight; and pH controlling agents, such as acids or bases, phosphate salts, carboxylate salts, sulfite salts, amine salts, and the like, present in an amount with respect to the acids of from 0 to about 5 percent by weight and preferably from about 0.01 to about 2 percent by weight, and with respect to the bases present in an amount of from 0 to about 10 percent by weight and preferably from about 4 to about 8 percent by weight Examples of ink polymers include a number of polymers, such as polyesters, polystyrene/acrylates, sulfonated polyesters, polyurethanes, polyimides and the like and preferably sulfonated polyesters. Also, in embodiments there may be selected as the ink polymer a sulfopolyester urethane illustrated in U.S. Pat. No. 5,786,410, the disclosure of which is totally incorporated herein by reference.

Examples of colorants, especially pigments include-Sun Fast Red 81:3, Sun Fast Pigment 15:3, Sun Fast Yellow 14 and 17, REGAL 330® Black (Cabot) in addition to other known suitable pigments, such as cyan, yellow, magenta, red, green, black, and mixtures thereof and specific examples of oil soluble dyes, that is dyes that are soluble, or substantially soluble in known oils, are Polyester Yellow, Blue 590, Red 420, Napthol Blue Black, Napthol Green B, Napthol Yellow S, Naphthyl Red hydrochloride Disperse Blue 1, Disperse Blue 3, Disperse Blue 14, Disperse Orange 1, Disperse Orange 3, Disperse Orange 13, Disperse Orange 25, Disperse Red 1, Disperse Red 13, Disperse Yellow 3, Disperse Yellow 7, Disperse Yellow 9, Sudan 1 Yellow, Sudan II Orange, Sudan III Red, Sudan IV Red, Sudan Black B, Sudan Blue 1, Sudan Blue II, Sudan Orange G, or Sudan Red 7B. Disperse Blue 3 (C.I. 61505), Disperse Blue 14 (C.I. 61500), Disperse Orange 1 (C.I. 11080), Disperse Orange 3 (C.I. 11005), Disperse Orange 11 (C.I. 60700), Disperse Orange 13 (C.I. 26080), Disperse Red 1 (C.I. 11110), Disperse Red 13 (C.I. 11115), Disperse Yellow 3 (C.I. 11855), Disperse Yellow 7 (C.I. 26090), Disperse Yellow 9 (C.I. 10375), Sudan 1 Yellow (C.I. 12055), Sudan II Orange (C.I. 12140), Sudan III Red (C.I. 26100), Sudan IV Red (C.I. 26105), Sudan Black B (C.I. 26150), Sudan Blue 1 (C.I. 61552), Sudan Blue 11 (C.I. 61554), Sudan Orange G (C.I. 11920), or Sudan Red 7B (C.I. 26050) and the like. Generally there can be selected as dyes known magenta, yellow, cyan, and black dyes.

Preferred colorants are oil soluble dyes such as Disperse Blue 14 (C.I. 61500), as Sudan Blue 670, Disperse Yellow 7 (C.I. 26090), Sudan Yellow 146, Sudan Red 7B (C.I. 26050), Sudan Red 380, Sudan Black B (C.I. 26150), Sudan Black X-60 dye and the like. Preferably, the colorant is an organic oil soluble dye with a high solubility (about 20 to about 60 weight percent by loading) preferably in a polyester resin or a pigmented polyester resin. More specifically, these oil soluble dyes are highly soluble in polyester resins, such as the polyester resin copoly(1,2-propylene-diethylene) terephthalate-copoly(sodium sulfoisophthalate dicarboxylate), or pigmented polyester resins wherein the polyester is a sulphonated polyester, for example copoly(1, 2-propylene-diethylene)terephthalate-copoly(sodium sulfoisophthalate dicarboxylate), and the pigment is for example a flushed cyan 15:3 pigment available from Sun Chemicals and which pigment is present in an amount of about 5 to about 25 weight percent. Specific examples of dyes suitable for the ink compositions of the present invention are Disperse Blue 3 (C.I. 61505), Disperse Blue 14 (C.I. 615006), Disperse Orange 1 (C.I. 11080), Disperse Orange 3 (C.I. 11005), Disperse Orange 11 (C.I. 60700), Disperse Orange 13 (C.I. 26080), Disperse Red 1 (C.I. 11110), Disperse Red 13 (C.I. 11115), Disperse Yellow 3 (C.I. 11855), Disperse Yellow 7 (C.I. 26090), Disperse Yellow 9 (C.I. 10375), Sudan 1 Yellow (C.I. 12055), Sudan II Orange (C.I. 12140), Sudan III Red (C.I. 26100), Sudan IV Red (C.I. 26105), Sudan Black B (C.I. 26150), Sudan Blue 1 (C.I. 61552), Sudan Blue 11 (C.I. 61554), Sudan Orange G (C.I. 11920), or Sudan Red 7B (C.I. 26050) and the like.

Known pigments of black, cyan, magenta, yellow, and the like, refenence U.S. Pat. No. 5,554,471, 5,593,807, 5,376, 454, and 5,304,449, the disclosures of which are totally incorporated herein by reference, can be selected for the pigmented polymers, and which pigment is selected in suitable amounts, such as from about 1 to about 20, and more specifically from about 2 to about 12 weight percent.

The ink compositions of the present invention are believed suitable for use in ink jet printing processes such as continuous stream, piezoelectric drop-on-demand, bubble jet or thermal ink jet processes. Generally, the printing process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ™ printer, Hewlett Packard DESK JET™ printers, the DIABLO C150 TIJ™ printer, or the like. Particularly preferred is a thermal ink jet printing apparatus. The inks of the present invention can be used to form images on a wide variety of substrates, including plain paper such as Xerox 4024 paper, bond paper such as GILBERT® 25 percent cotton bond paper or GILBERT® 100 percent cotton bond paper, silica coated papers, transparency materials, fabrics, plastics, polymeric films, and the like.

The following Examples are being submitted to illustrate various aspects of the present invention. These Examples are intended to be illustrative only and are not intended to limit the scope of the present invention. Also, parts and percentages are by weight unless otherwise indicated. The viscosities were obtained, or measured with a Brookfield Digital Viscometer Model LV with UL adapter at room temperature, about 25 degrees Centigrade. The surface tension was obtained, or measured at about 25 degrees Centigrade with a Kruss Tensiometer Model K10T using a Whilhelmy plate. The particle size data were obtained with a Nicomp Particle Sizing System, Model 370.

EXPERIMENTAL

Preparation of Sulfonated Polyesters
Preparation of Linear Moderately Sulfonated Polyester A linear sulfonated random copolyester resin product comprised of on a mol percent of approximately 0.465 terephthalate, 0.035 sodium sulfoisophthalate, 0.475 1,2-propanediol, and 0.025 diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulfoisophthalate, 310.94 grams of 1,2-propanediol (1 mole excess of glycols), 22.36 grams of diethylene glycol, (1 mole excess of the glycol) and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C.(Centigrade) over a one hour period, after which the pressure was slowly reduced from atmospheric pressure to about 260 Torr over a one hour period, and then reduced to 5 Torr over a two hour period with the collection of approximately 122 grams of distillate in the distillation receiver and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield the above product, 460 grams of the 3.5 mol percent sulfonated-polyester resin, copoly(1,2-propylene-diethylene)terephthalate-copoly (sodium sulfoisophthalate dicarboxylate). The sulfonated-polyester resin glass transition temperature was measured to be 54.6° C. (onset) utilizing the 910 Differential Scanning Calorimeter available from E.I. DuPont operating at a heating rate of 10° C. per minute. The number average molecular weight was measured to be 1,500 grams per mole, and the weight average molecular weight was measured to be 3,160 grams per mole using tetrahydrofuran as the solvent. This resin was utilized for the preparation of dye-toner particles in the following Examples.

Preparation of Flushed Pigmented Sulfonated Polyesters for Inks Molten Flushed Process Magenta To a sample (200 grams) of the above prepared molten polyester (>150° C.) in an explosion proof stainless steel batch mixer reactor equipped with a high power to volume ratio sigma blade was rapidly added 50 percent of a Sun Fast Red 81:3 wet presscake, available from Sun Chemicals, which is comprised of 50 to 70 percent magenta 81:3 pigment solids by weight. Initial mixing was continued for 15 minutes, after which the remaining 50 percent of the presscake was slowly added to the reaction mixture over a 2 hour period. The reactor was then allowed to cool to 50° C. The water at the top of the reactor was decanted and the remaining water removed by vacuum drying. The resulting pigmented polyester was heated to about 175° C. and then discharged. The resulting composition of the dry pigmented resin prepared by this process was 85 percent of the sulfonated polyester product and 15 percent of the flushed Sun Fast Red 81:3 magenta pigment.

Cyan

To a sample (200 grams) of the above prepared molten polyester (>150° C.) in an explosion proof stainless steel batch reactor mixer equipped with a high power to volume ratio sigma blade was rapidly added 50 percent of a Sun Fast Pigment Blue 15:3 wet presscake, available from Sun Chemicals, which is comprised of 50 to 70 percent cyan 15:3 pigment solids by weight. Initial mixing was continued for 15 minutes, after which the remaining 50 percent of the presscake was slowly added to the reaction mixture over a 2 hour period. The reactor was then allowed to cool to 50° C. The water at the top of the reactor was decanted and the remaining water removed by vacuum drying. The resulting pigmented polyester was heated to about 175° C. and then discharged. The resulting composition of the dry pigmented resin prepared by this process was 85 percent of the sulfonated polyester and 15 percent of the flushed blue 15:3 pigment.

Black

To a sample (200 grams) of the above prepared molten polyester (>150° C.) in an explosion proof stainless steel batch reactor mixer equipped with a high power to volume ratio sigma blade was rapidly added 50 percent of REGAL 330® carbon black wet presscake, available from Cabot Chemicals, which is comprised of 50 to 70 percent black pigment 330® solids by weight. Initial mixing was continued for 15 minutes, after which the remaining 50 percent of the presscake was slowly added to the reaction mixture over a 2 hour period. The reactor was then allowed to cool to 50° C. The water at the top of the reactor was decanted and the remaining water removed by vacuum drying. The resulting pigmented polyester was heated to 175° C. and then discharged. The composition of the dry pigmented resin prepared by this process was 85 percent of the sulfonated polyester and 15 percent of the flushed black 330® pigment.

Yellow

To a sample (200 grams) of the above prepared molten polyester (>150° C.) in an explosion proof stainless steel batch reactor mixer equipped with a high power to volume ratio sigma blade was rapidly added 50 percent of a Sun Fast Yellow 14 wet presscake, available from Sun Chemicals, which is comprised of 50 to 70 percent yellow pigment 14 solids by weight. Initial mixing was continued for 15 minutes, after which the remaining 50 percent of the presscake was slowly added to the reaction mixture over a 2 hour period. The reactor was then allowed to cool to 50° C. The water at the top of the reactor was decanted and the remaining water removed by vacuum drying. The resulting pigmented polyester was heated to 175° C. and then discharged. The resulting composition of the pigmented resin prepared was 85 percent of the sulfonated polyester and 15 percent of the flushed yellow 14 pigment.

Melt Extrusion of Pigmented Sulfonated Polyester to Incorporate an Organic Soluble Dye for Inks Magenta A sample (200 grams) of the above magenta pigmented resin containing 15 percent by weight of magenta pigment Sun Fast Red 81:3, was heated to the melt temperature of the pigmented sulfonated polyester (150 to 175° C.) in a one liter Parr reactor and 5 grams of the red/magenta organic oil soluble dye, Sudan Red 7B (C.I. 26050), was added to and dissolved into the melt. The polymer was then extruded to yield a dye-pigmented magenta sulfonated polyester with a resulting composition of 83 percent by weight of the sulfonated polyester, 14.6 percent by weight of the flushed magenta 81:3 pigment, and 2.4 weight percent of the organic soluble dye Sudan Red 7B.

Cyan

A sample (200 grams) of the above pigmented resin containing 15 percent by weight of Sun Fast Pigment Blue 15:3, was heated to the melt temperature of the pigmented sulfonated polyester (150 to 175° C.) in a one liter Parr reactor and 5 grams of the blue/cyan organic soluble dye, Disperse Blue 14 (C.I. 61500), was dissolved into the melt. The polymer mixture was then extruded to yield a dye-pigmented cyan sulfonated polyester with a resulting composition of 83 percent by weight of the sulfonated polyester, 14.6 percent by weight of the flushed cyan 15:3 pigment, and 2.4 weight percent of the organic soluble dye Disperse Blue 14.

Yellow

A sample (200 grams) of the above pigmented resin containing 15 percent by weight of yellow pigment 14 obtained from Sun Chemicals, was heated to the melt temperature of the pigmented sulfonated polyester (150 to 175° C.) in a one liter Parr reactor and 5 grams of the yellow organic soluble dye, Disperse Yellow 7 (C.I. 26090), was dissolved into the melt. The polymer was then extruded to yield a dye-pigmented yellow sulfonated polyester with 83 percent by weight of the sulfonated polyester, 14.6 percent by weight of the flushed yellow pigment, and 2.4 weight percent of the organic soluble dye Disperse Yellow 7.

Black

A sample (200 grams) of the above pigmented resin, containing 15 percent by weight of REGAL 330R carbon black, was heated to the melt temperature of the pigmented sulfonated polyester (150 to 175° C.) in a one liter Parr reactor and 5 grams of a black organic soluble dye (Sudan Black B (C.I. 26150)) was dissolved into the melt. The polymer was then extruded to yield a dye-pigmented black sulfonated polyester with 83 percent by weight of the sulfonated polyester, 14.6 percent by weight of the REGAL 330R carbon black pigment, and 2.4 weight percent of the organic soluble dye Sudan Black B.

Formulation of High Optical Density Ink Dispersions Utilizing a Dye/Pigmented Sulfo-polyester Resin Ink formulations utilizing dispersions containing dye/pigmented particles can be prepared as follows:

EXAMPLE I

Preparation of a Magenta Ink Dispersion

A 125 gram sample of the above red/magenta dye-pigmented polyester prepared by a melt-mixing flushing process can be dissipated within 7 minutes to a solution containing 20 percent by weight of the dye-pigmented resin, by the addition of the sample material, with stirring, to 500 milliliters (milliliters) of warm distilled deionized water (75° C.) in a glass reactor yielding stable, submicron sized particles (20 to 100 nanometers). To 50 milliliters of the magenta stock solution are added water (5.98 grams), followed by sulfolane, (1 gram) butyl carbitol (1 gram) and sodium lauryl sulfate (0.02 gram). The solution is then stirred at room temperature, about 25 to about 35° C., for 1 hour; and the ink resulting is filtered through a 0.85 micron filter. The measurable physical qualities for the resulting inks prepared in this fashion will have viscosities it is believed in the range of 2 to 3 cps, surface tension values of between 30 to 60 dynes/cm, pH values in the range of 5 to 9, and particle sizes by volume of between 30 to 100 nanometers Jetting Properties The magenta ink as formulated can be jetted at 600 spi using a LYC printhead attached to an experimental Xerox Corporation print fixture, using a multiple pass protocol at 100, 200 and 300 percent coverage on Xerox paper (4024) and on Xerox transparencies (B112). The inks are generally quick drying (5 to 20 seconds) and will display excellent offset qualities, with little or no change in the expected measurable optical density (between 1.0 to 1.4) of prints tested on an MacBeth text fixture, with optical density measured in a reflectance mode averaged over 5 test areas. The dissipatible inks will also display excellent waterfastness properties (80 to 99 percent of image retained) when immersed in room temperature, about 25° C. throughout, deionized water for 1 to 2 minutes.

EXAMPLE II

Preparation of a Cyan Ink Dispersion

A 125 gram sample of the above blue/cyan dye-pigmented polyester prepared by a melt-mixing flushing process can be dissipated within 7 minutes by the addition of the sample material, with stirring, to 500 milliliters of warm distilled deionized water (75° C.) in a glass reactor yielding stable, submicron sized particles (20–100 nanometers). To 50 milliliters of the cyan stock solution are added water (5.98 grams), followed by sulfolane, (1 gram) butyl carbitol (1 gram) and sodium lauryl sulfate (0.02 gram). The solution is then stirred at room temperature, about 25° C. to about 35° C., for 1 hour; and the ink resulting is filtered through a 0.85 micron filter. The measurable physical qualities for the resulting inks prepared in this fashion will have viscosities in the range of 2 to 3 cps, surface tension values of between 30 to 60 dynes/cm, pH values in the range of 5 to 9, and particle sizes by volume of between 30 to 100 nanometers.

Jetting Properties

The cyan ink as formulated can be jetted at 600 spi using a LYC printhead attached to an experimental Xerox Corporation print fixture, using a multiple pass protocol at 100, 200 and 300 percent coverage on Xerox paper (4024) and on Xerox transparencies (B112). The inks are generally quick drying (5 to 20 seconds) and will display excellent offset qualities, with little or no change expected in the measurable optical density (between 1.0 to 1.4) of prints tested on an MacBeth text fixture, with optical density measured in a reflectance mode averaged over 5 test areas. The inks will also display excellent waterfastness properties (80 to 99 percent of image retained) when immersed in room temperature, about 25° C. throughout, deionized water for 1 to 2 minutes.

EXAMPLE III
Preparation of a Yellow Ink Dispersion

A 125 gram sample of the above yellow dye-pigmented polyester prepared by a melt-mixing flushing process can be dissipated within 7 minutes by the addition of the sample material, with stirring, to 500 milliliters (milliliters) of warm distilled deionized water (75° C.) in a glass reactor yielding stable, submicron sized particles (20 to 100 nanometers). To 50 milliliters of the yellow stock solution are added water (5.98 grams), followed by sulfolane, (1 gram) butyl carbitol (1 gram) and sodium lauryl sulfate (0.02 gram). The solution is then stirred at room temperature, about 25° C. to about 35° C., for 1 hour; and the ink resulting is filtered through a 0.85 micron filter. The measurable physical qualities for the resulting inks will have viscosities in the range of 2 to 3 cps, surface tension values of between 30 to 60 dynes/cm, pH values in the range of 5 to 9, and particle sizes by volume of between 30 to 100 nanometers.

Jetting Properties

The yellow ink as formulated can be jetted at 600 spi using a LYC printhead attached to an experimental Xerox Corporation print fixture, using a multiple pass protocol at 100, 200 and 300 percent coverage on Xerox paper (4024) and on Xerox transparencies (B112). The inks are generally quick drying (5 to 20 seconds) and will display excellent offset qualities, with little or no change expected in the measurable optical density (between 1.0 to 1.4) of prints tested on an MacBeth text fixture, with optical density measured in a reflectance mode averaged over 5 test areas. The dissipatible inks will also display excellent waterfastness properties (80 to 99 percent of image retained) when immersed in room temperature, about 25° C. throughout, deionized water for 1 to 2 minutes.

EXAMPLE IV
Preparation of a Black Ink Dispersion

A 125 gram sample of the above black dye-pigmented polyester prepared by a melt-mixing flushing process can be dissipated within 7 minutes by the addition of the sample material, with stirring, to 500 milliliters of warm distilled deionized water (75° C.) in a glass reactor yielding stable, submicron sized particles (20 to 100 nanometers). To 50 milliliters of the black stock solution are added water (5.98 grams), followed by sulfolane, (1 gram) butyl carbitol (1 gram) and sodium lauryl sulfate (0.02 gram). The solution is then stirred at room temperature, about 25 to about 35° C., for 1 hour; and the ink resulting is filtered through a 0.85 micron filter. The measurable physical qualities for the resulting inks will have viscosities in the range of 2 to 3 cps., surface tension values of between 30 to 60 dynes/cm, pH values in the range of 5 to 9, and particle sizes by volume of between 30 to 100 nanometers.

Jetting Properties

The black ink as formulated can be jetted at 600 spi using a LYC printhead attached to an experimental Xerox Corporation print fixture, using a multiple pass protocol at 100, 200 and 300 percent coverage on Xerox paper (4024) and on Xerox transparencies (B112). The inks are generally quick drying (5 to 20 seconds) and will display excellent offset qualities, with little or no change expected in the measurable optical density (between 1.0 to 1.4) of prints tested on an MacBeth text fixture, with optical density measured in a reflectance mode averaged over 5 test areas. The dissipatible inks will also display excellent waterfastness properties (80 to 99 percent of image retained) when immersed in room temperature, about 25° C. throughout, deionized water for 1 to 2 minutes.

Other modifications of the present invention may occur to those of ordinary skill in the art subsequent to a review of the present application and these modifications, including equivalents thereof, are intended to be included within the scope of the present invention.

What is claimed is:

1. An ink composition consisting essentially of from about 20 to about 80 weight percent of water, from about 1 to about 25 weight percent of pigmented polymer, oil soluble colorant, and optionally from about 2 to about 50 weight percent of a glycol, and wherein said oil soluble colorant is present in an amount of from about 0.01 to about 30 weight percent of the pigmented polymer.

2. An ink in accordance with claim 1 wherein said oil soluble colorant is selected in an amount of from about 5 to about 20 weight percent.

3. An ink in accordance with claim 1 wherein said polymer is a sulfonated polyester with a degree of sulfonation of from about 2.5 to about 10 mol percent.

4. An ink in accordance with claim 1 wherein said oil soluble colorant increases the optical density of said ink.

5. An ink in accordance with claim 1 wherein the oil soluble colorant is an oil soluble dye, and which dye is present in an amount of from about 1 to about 5 weight percent, and wherein the pigmented polymer is present in an amount of form about 1 to about 20 weight percent.

6. A printing process which comprises (1) incorporating into an ink jet printing apparatus the ink composition of claim 5, and (2) causing droplets of the ink to be ejected in an imagewise pattern onto a substrate.

7. A printing process in accordance with claim 6 wherein the ink jet printing apparatus employs a thermal ink jet printing process, and wherein there are provided prints on paper with solid area coverage with an optical density of from about 1.4 to about 1.6, and wherein the prints possess a waterfastness of from about 80 percent to about 99 percent.

8. An ink in accordance with claim 1 wherein said pigmented polymer is present in an amount of about 5 weight percent.

9. An ink in accordance with claim 1 wherein said polymer is a polyester.

10. An ink in accordance with claim 1 wherein said polymer is a sulfonated polyester.

11. An ink in accordance with claim 1 wherein said pigmented polymer contains as the pigment carbon black, cyan, magenta or yellow.

12. An ink in accordance with claim 1 wherein said oil soluble dye is black, yellow, magenta, cyan, red or blue.

13. An ink in accordance with claim 1 wherein the polymer is a sulfopolyester oligomer with a weight average molecular weight of from about 1,000 to about 10,000.

14. An ink in accordance with claim 13 wherein the sulfopolyester is an oligomer with a weight average molecular weight of about 5,000.

15. An ink in accordance with claim 1 wherein the pigment for said pigmented polymer is present in an amount of from about 1 to about 20 weight percent based on the weight percent of the repeat unit of the polymer.

16. An ink in accordance with claim 15 wherein the polymer is a sulfonated polyester.

17. An ink in accordance with claim 1 wherein the polymer is the sulfopolyester copoly(1,2-propylene-diethylene)terephthalate-copoly(sodium sulfoisophthalate dicarboxylate.

18. An ink in accordance with claim 1 further containing ink additives.

19. An ink in accordance with claim 18 wherein the ink additive is a humectant.

20. An ink in accordance with claim 1 wherein the dye is a blue dye, an orange dye, a yellow dye, or a red dye.

21. An ink in accordance with claim 1 wherein the glycol is present in an amount of from about 2 to about 25 percent by weight.

22. An ink composition consisting essentially of water, colored polymer, and oil soluble colorant.

23. An ink in accordance with claim 22 wherein the colorant is a dye, and the colored polymer is a pigmented polymer.

24. An ink in accordance with claim 22 wherein the colorant is a dye, the colored polymer is a pigmented polymer of a pigmented sulfonated polyester, and wherein there is selected from about 20 to about 80 weight percent of water, from about 1 to about 25 weight percent of pigmented sulfonated polyester, and from about 2 to about 50 weight percent of ink additive of a glycol, and wherein said oil soluble dye is present in an amount of from about 0.01 to about 20 weight percent of the pigmented polymer.

25. An ink in accordance with claim 22 and containing sulfonated, alkyl carbitol, and a sulfate.

26. A process for the preparation of inks jet inks which comprises the mixing of an oil soluble colorant and a pigmented polymer.

27. A process in accordance with claim 26 wherein prior to or subsequent to mixing said oil soluble colorant is added in an amount of from about 0.1 to about 25 weight percent.

28. A process in accordance with claim 27 wherein said colorant is a dye and said dye is selected in an amount of from about 0.1 to about 5 weight percent.

29. A process in accordance with claim 26 wherein said pigmented polymer is generated by the flushing of said pigment in said polymer, and which polymer is a sulfonated polyester, and which resin has a sulfonation degree of from about 2.5 to about 20 mol percent based on the repeat unit of the polymer, and thereafter dispersing the resulting sulfonated pigmented polyester resin into warm water, which water is at a temperature of from about 40° C. to about 95° C., and which dispersing is with a high speed mixing device thereby enabling the formation of stable submicron particles, and which particles are of a volume average diameter of from about 5 to about 150 nanometers.

30. A process in accordance with claim 29 wherein said pigment polymer contains from about 5 to about 25 weight percent of pigment based on said polymer, and said dye is present in an amount of from about 1 to about 5 weight percent.

* * * * *